(12) United States Patent
Seo et al.

(10) Patent No.: US 10,834,622 B2
(45) Date of Patent: Nov. 10, 2020

(54) METHOD BY WHICH TERMINAL REPORTS CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Hanbyul Seo, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/772,430

(22) PCT Filed: Oct. 28, 2016

(86) PCT No.: PCT/KR2016/012209
§ 371 (c)(1),
(2) Date: Apr. 30, 2018

(87) PCT Pub. No.: WO2017/074083
PCT Pub. Date: May 4, 2017

(65) Prior Publication Data
US 2018/0317112 A1    Nov. 1, 2018

Related U.S. Application Data

(60) Provisional application No. 62/248,282, filed on Oct. 29, 2015.

(51) Int. Cl.
*H04W 24/10* (2009.01)
*H04W 72/04* (2009.01)
(Continued)

(52) U.S. Cl.
CPC ............ *H04W 24/10* (2013.01); *H04B 17/24* (2015.01); *H04B 17/345* (2015.01); *H04W 72/0406* (2013.01)

(58) Field of Classification Search
None
See application file for complete search history.

(56) References Cited

U.S. PATENT DOCUMENTS

| 9,838,102 B2 * | 12/2017 | Xiao | H04W 72/082 |
| 2013/0242902 A1 * | 9/2013 | Liu | H04W 24/10 |
| | | | 370/329 |

(Continued)

FOREIGN PATENT DOCUMENTS

| KR | 10-2015-0009538 A | 1/2015 |
| WO | WO 2014/142571 A1 | 9/2014 |
| WO | WO 2015/037883 A1 | 3/2015 |

OTHER PUBLICATIONS

Huawei et al, "CSI Process With or Without IMR and Related Interference Measurement," R1-155072, 3GPP TSG RAN WG1 Meeting #82bis, Malmo, Sweden, Oct. 5-9, 2015, 5 pages.

(Continued)

*Primary Examiner* — Ruihua Zhang
(74) *Attorney, Agent, or Firm* — Birch, Stewart, Kolasch & Birch, LLP

(57) ABSTRACT

A method by which a terminal reports CSI in a wireless communication system, according to an embodiment of the present invention, comprises the steps of: calculating CSI for at least one interference measurement resource selected from among a plurality of interference measurement resources respectively having unique indices in a specific subframe; and reporting the CSI to a base station, wherein the CSI can be reported with a subframe index of the specific subframe and the unique index of the at least one interference measurement resource.

6 Claims, 12 Drawing Sheets

(51) Int. Cl.
  *H04B 17/345* (2015.01)
  *H04B 17/24* (2015.01)

(56) References Cited

U.S. PATENT DOCUMENTS

| | | | | |
|---|---|---|---|---|
| 2014/0086173 | A1* | 3/2014 | Sadeghi | H04L 5/005 |
| | | | | 370/329 |
| 2016/0269160 | A1* | 9/2016 | Noh | H04L 5/0048 |
| 2017/0070905 | A1* | 3/2017 | Li | H04W 24/10 |
| 2017/0238320 | A1* | 8/2017 | Fukuta | H04W 16/14 |
| | | | | 370/329 |

OTHER PUBLICATIONS

ZTE, "Discussion on CSI Measurement and Feedback Related Configurations," R1-155260, 3GPP TSG RAN WG1 Meeting #82bis, Malmo, Sweden, Oct. 5-9, 2015, 5 pages.

* cited by examiner

E-UMTS

FIG. 2
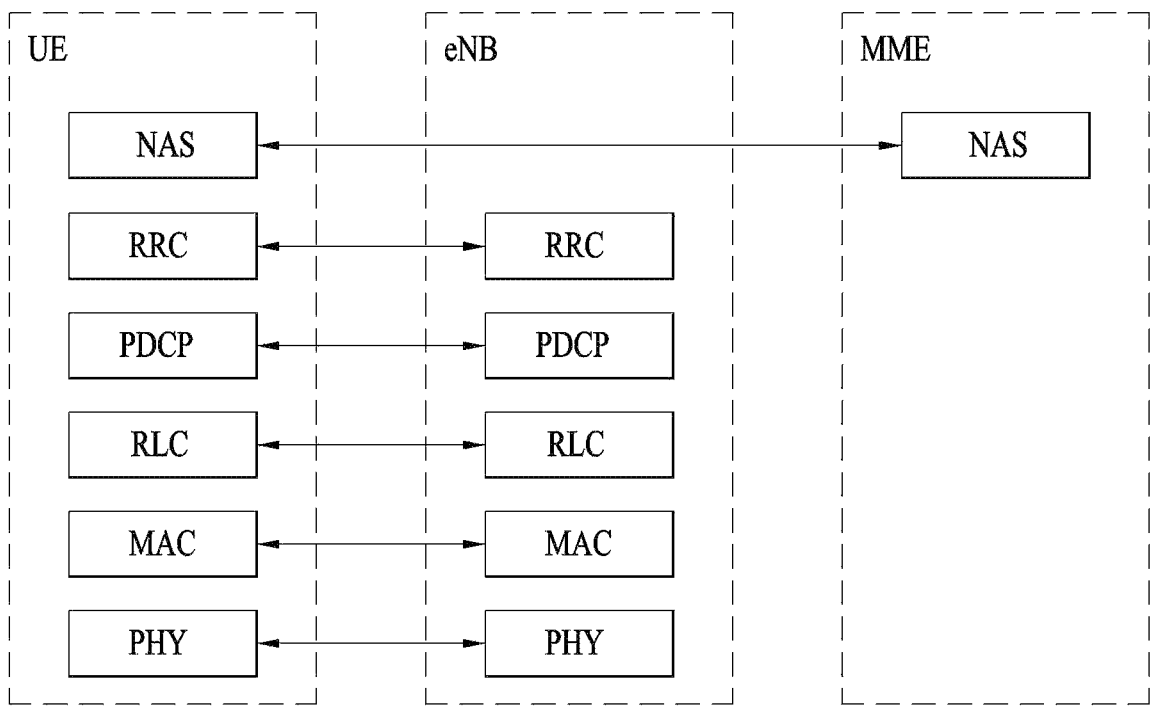
(A) CONTROL-PLANE PROTOCOL STACK
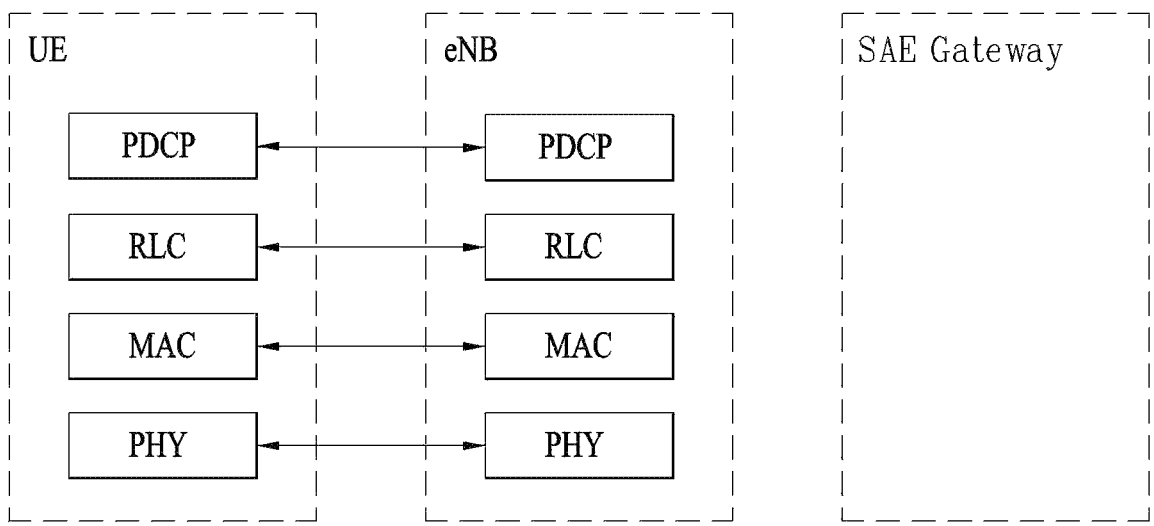
(B) USER-PLANE PROTOCOL STACK

FIG. 7
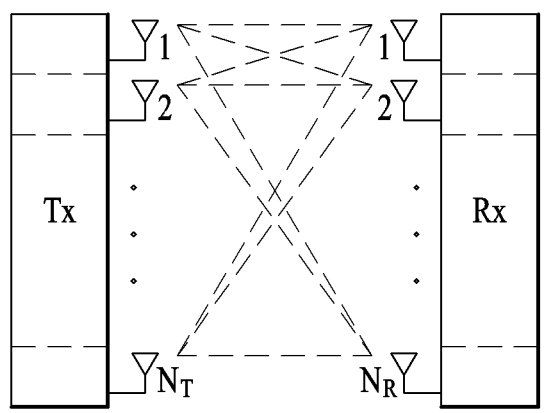
(a)
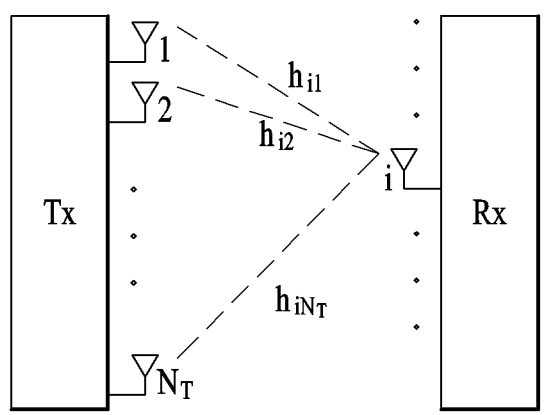
(b)

METHOD BY WHICH TERMINAL REPORTS CHANNEL STATE INFORMATION IN WIRELESS COMMUNICATION SYSTEM AND APPARATUS THEREFOR

CROSS REFERENCE TO RELATED APPLICATIONS

This application is the National Phase of PCT International Application No. PCT/KR2016/012209, filed on Oct. 28, 2016, which claims priority under 35 U.S.C. 119(e) to U.S. Provisional Application No. 62/248,282, filed on Oct. 29, 2015, all of which are hereby expressly incorporated by reference into the present application.

TECHNICAL FIELD

The present invention relates to a wireless communication system, and more particularly, to a method of reporting CSI of a user equipment in a wireless communication system and apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE OF THE INVENTION

Technical Task

The technical task of the present invention is to propose a method of reporting CSI of a user equipment in a wireless communication system and operations related thereto.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

The object of the present invention can be achieved by providing a method of reporting CSI (channel status information) by a user equipment in a wireless communication system, the method comprising: calculating the CSI on at least one interference measurement resource selected from a plurality of interference measurement resources respectively having unique indexes in a specific subframe; and reporting the CSI to a base station, wherein the CSI is reported together with a subframe index of the specific subframe and the unique index of the at least one interference measurement resource.

Additionally or alternatively, at least one of a downlink interference signal from the base station, an uplink interference signal from the user equipment or other user equipments, and a D2D (device-to-device) interference signal from the user equipment or other user equipments is transmitted on each of a plurality of the interference measurement resources.

Additionally or alternatively, the method further comprises selecting the at least one interference measurement resource from a plurality of the interference measurement resources.

Additionally or alternatively, the method further comprises receiving a control signal instructing to select the at least one interference measurement resource from a plurality of the interference measurement resources from the base station.

Additionally or alternatively, the method further comprises receiving a control signal indicating an interference measurement resource set configured with some of a plurality of the interference measurement resources from the base station, wherein the at least one interference measurement resource is selected from the interference measurement resource set by the user equipment.

Additionally or alternatively, the at least one interference measurement resource comprises a resource having an interference value equal to or smaller than a specific threshold among a plurality of the interference measurement resources.

Additionally or alternatively, the method further comprises reporting a unique index of a resource having an interference value equal to or greater than a specific threshold and a subframe index of a subframe, to which the resource having the interference value equal to or greater than a specific threshold belongs, to the base station.

The technical solutions just include embodiments of the present invention in part, and various embodiments reflecting the technical features of the present invention can be derived and understood by those skilled in the art, to which the corresponding technical field pertains, based on the detailed description of the present invention in the following.

Advantageous Effects

According to the present invention, a user equipment (UE) operates in a manner of performing CSI calculation and reporting on some of a plurality of interference measurement resources and also reporting information on an interference measurement resource that becomes a target of the corresponding CSI. Therefore, the UE can effectively measure and report CSI by considering overhead that may be accompanied by an excessive CSI report in a situation that a plurality of transmitting and receiving devices change a transmission scheme dynamically.

The effects which can be obtained by the present invention are not limited to the above-described effects and other effects which are not described herein will become apparent to those skilled in the art from the following description.

DESCRIPTION OF DRAWINGS

FIG. 2 is a diagram illustrating structures of a control plane and a user plane of a radio interface protocol between a UE and an E-UTRAN based on the 3GPP radio access network specification according to an embodiment of the present invention.

FIG. 7 is a diagram showing the structure of a general multiple input multiple output (MIMO) communication system according to an embodiment of the present invention.

BEST MODE FOR INVENTION

Figure 1:
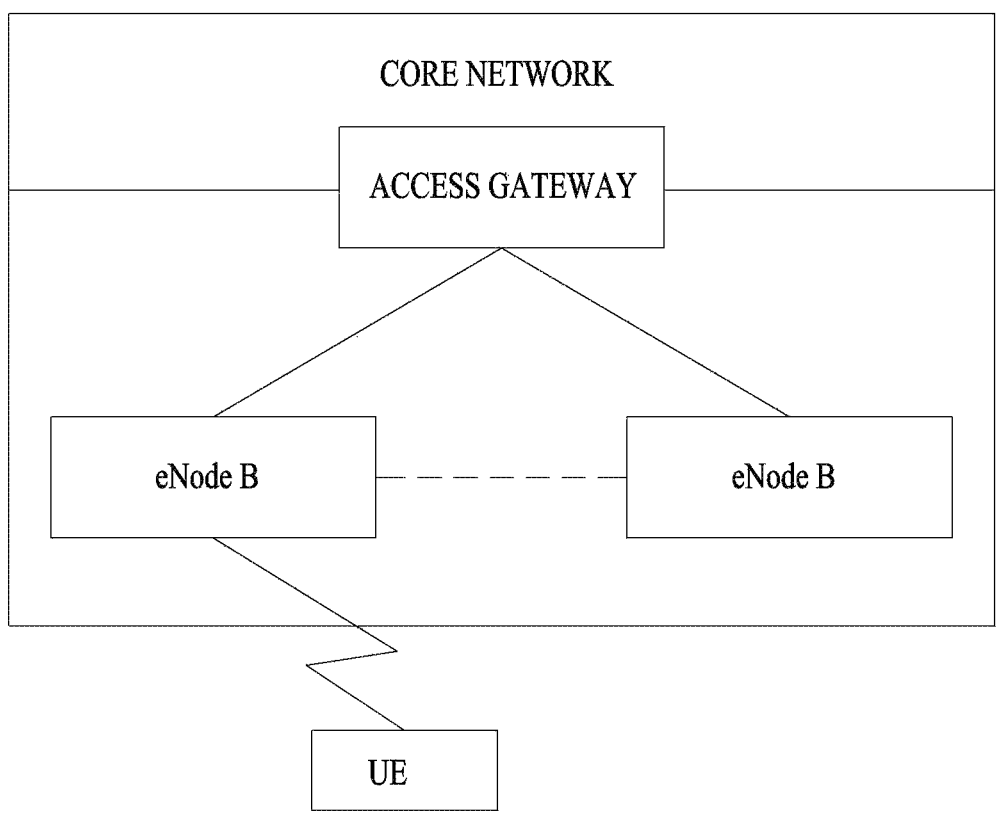
FIG. 1 is a diagram schematically illustrating a network structure of an E-UMTS as an exemplary radio communication system according to an embodiment of the present invention.

Configuration, action and other features of the present invention can be easily understood by embodiments of the present invention described in the following with reference to the accompanying drawings. The embodiments described in the following are examples of applying the technical features of the present invention to a 3GPP system Although the present specification describes an embodiment of the present invention using the LTE system and the LTE-A system as an example, the embodiment of the present invention is applicable to any communication systems corresponding to the above definition. Moreover, although the present specification describes the embodiment of the present invention with reference to FDD scheme as an example, the embodiment of the present invention is applicable to H-FDD scheme or TDD scheme by being easily modified.

Moreover, a name of a base station can be used as an inclusive term that includes RRH (remove radio head), eNB, TP (transmission point), RP (reception point), a relay and the like.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by the standard documents disclosed in any one of wireless access systems, such as an IEEE 802 system, a 3rd Generation Partnership Project (3GPP) system, 3GPP Long Term Evolution (LTE) and LTE-Advanced (LTE-A) systems, and a 3GPP2 system. That is, the steps or portions, which are not described in order to make the technical spirit of the present invention clear, may be supported by the above documents. In addition, all the terms disclosed in the present document may be described by the above standard documents.

The following technology can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA).

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

FIG. 2 is a diagram illustrating structures of a control plane and a user plane of a radio interface protocol between a UE and an E-UTRAN based on the 3GPP radio access network specification according to an embodiment of the present invention.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
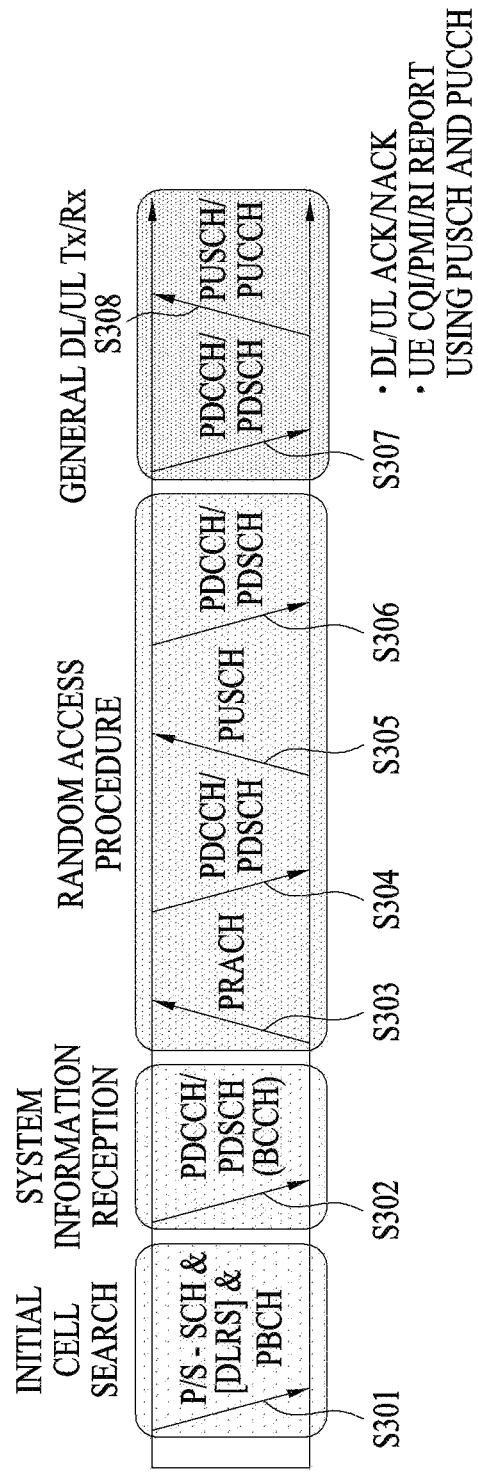
FIG. 3 is a diagram illustrating physical channels used in a 3GPP system and a general signal transmission method using the same according to an embodiment of the present invention.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
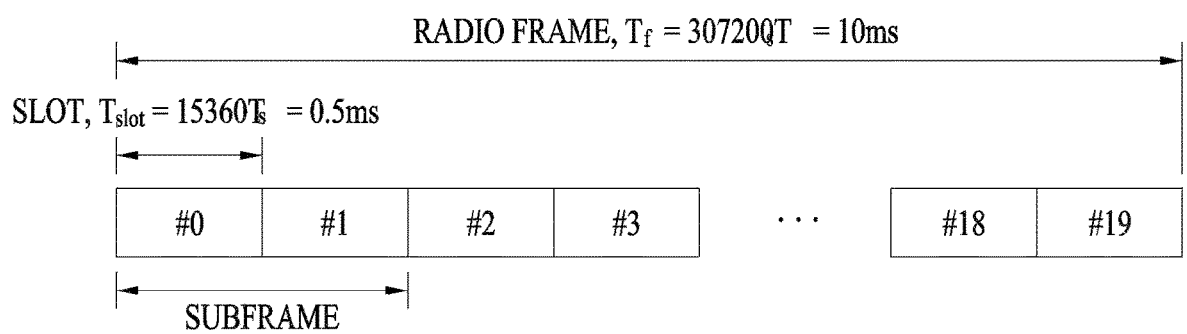
FIG. 4 is a diagram illustrating the structure of a radio frame used in an LTE system according to an embodiment of the present invention.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10−8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
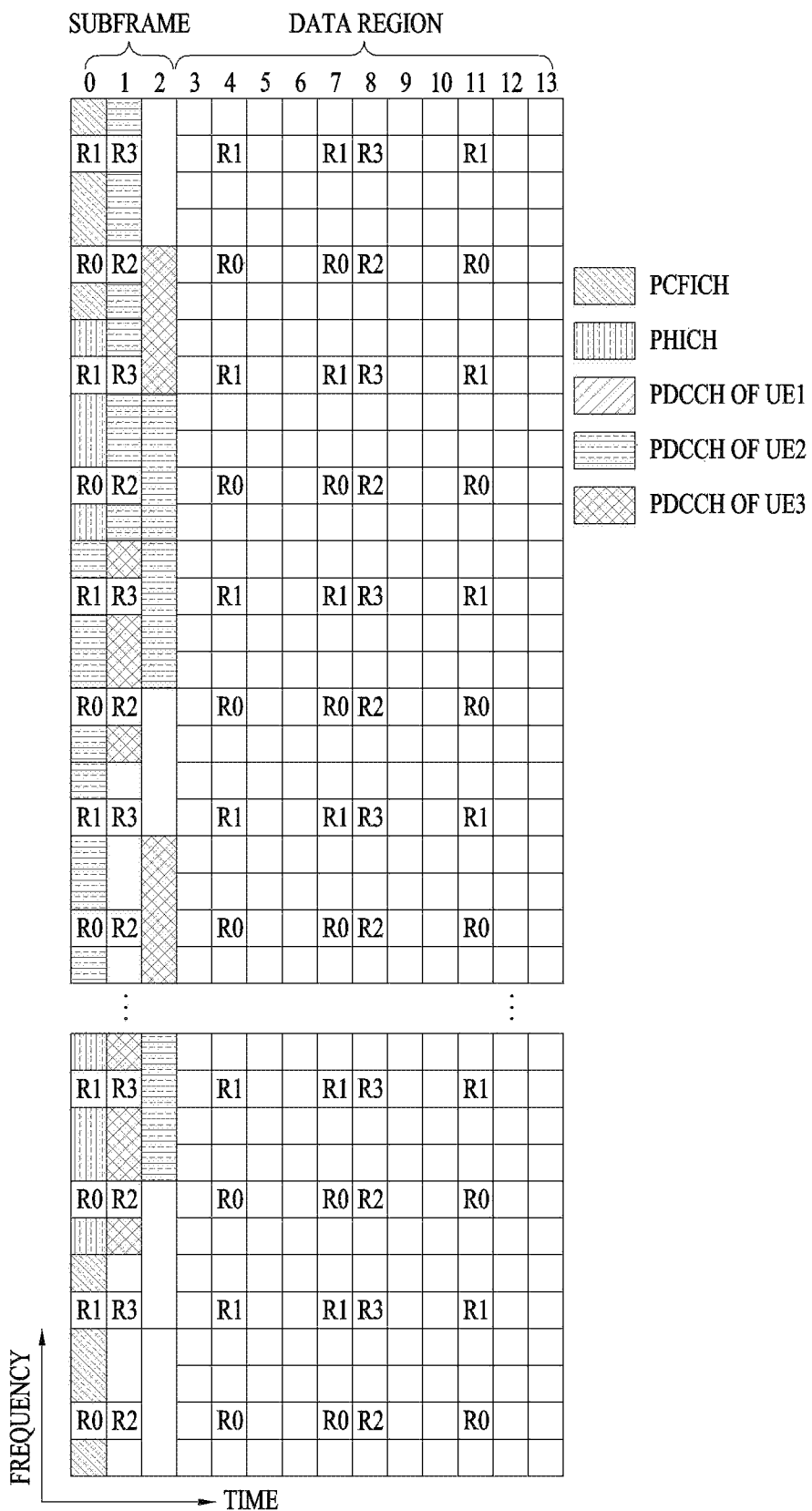
FIG. 5 is a diagram showing the structure of a downlink radio frame used in an LTE system according to an embodiment of the present invention.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
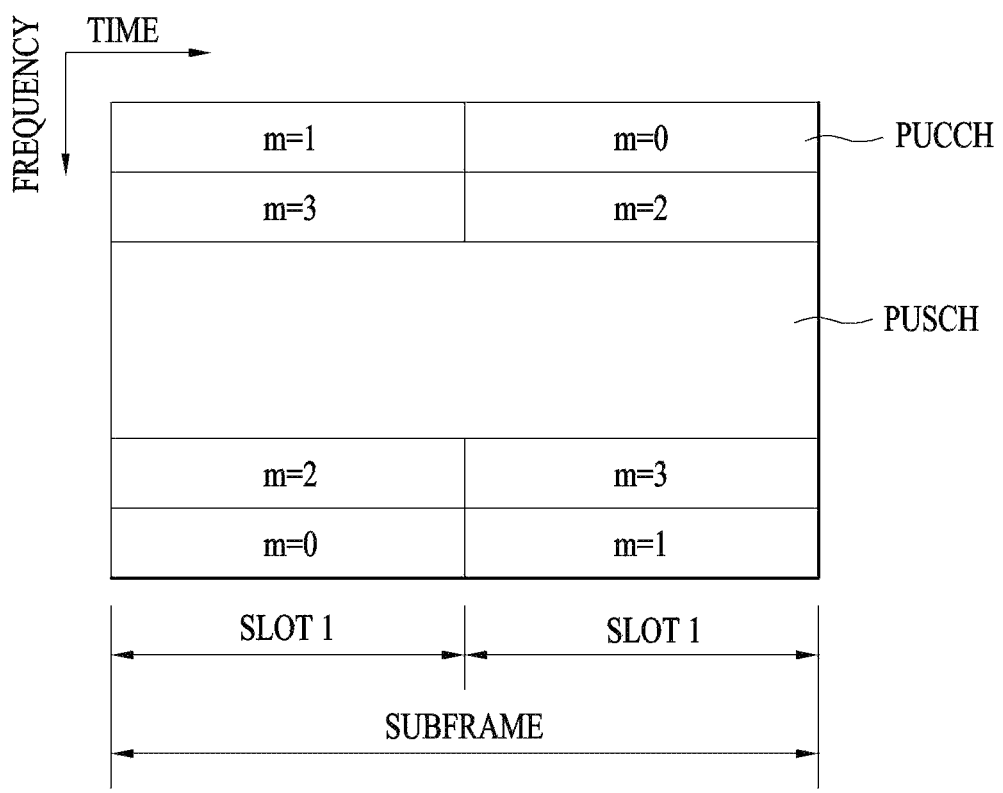
FIG. 6 is a diagram showing the structure of an uplink radio frame used in an LTE system according to an embodiment of the present invention.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, MIMO (multiple input and multiple output) communication system is described. FIG. 7 is a diagram to describe MIMO.

As shown in FIG. 7 (a), if the number of transmission (Tx) antennas increases to $N_t$, and at the same time the number of reception (Rx) antennas increases to $N_R$, a theoretical channel transmission capacity of the MIMO communication system increases in proportion to the number of antennas, differently from the above-mentioned case in which only a transmitter or receiver uses a multitude of antennas. Therefore, a transmission rate and frequency efficiency can be greatly increased. As the channel transmission capacity increase, the transmission rate can be theoretically increased by an amount resulting from multiplying a maximum transmission rate (Ro) of a single antenna use by a rate increment rate (Ri).

$$R_i = \min(N_T, N_R) \quad \text{[Equation 1]}$$

For example, in an MIMO (multiple input and multiple output) communication system that uses 4 Tx antennas and 4 Rx antennas, it is able to obtain a transmission rate theoretically 4 times greater than that in a single antenna system.

A communication method in a multi-antenna system shall be described in detail suing a mathematical modeling. In the above system, assume that $N_T$ Tx antennas and $N_R$ Rx antennas exist.

Regarding a transmission (Tx) signal, a maximum number of transmittable information is $N_T$ under in case of a presence of $N_T$ Tx antennas. The transmission information can be expressed as follows.

$$s = [s_1, s_2, \Lambda, s_{N_T}]^T \quad \text{[Equation 2]}$$

Transmission informations $s_1, s_2 \ldots s_{N_T}$ may differ from each other in transmission power. If the transmission powers are denoted by $P_1, P_2 \ldots P_{N_T}$, transmission information having an adjusted transmission power can be represented as follows.

$$\hat{s} = [\hat{s}_1, \hat{s}_2, \Lambda, \hat{s}_{N_T}]^T = [P_1 s_1, P_2 s_2, \Lambda, P_{N_T} s_{N_T}]^T \quad \text{[Equation 3]}$$

And, ŝ can be represented as follows, using a diagonal matrix P.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

Let's consider a case of configuring $N_T$ transmission (Tx) signals $x_1, x_2 \ldots x_{N_T}$ actually transmitted by applying a weight matrix W to the information vector ŝ having an adjusted transmission power. The weight matrix plays a role in appropriately distributing transmission (Tx) information to each antenna according to a transport channel situation or the like. And, $x_1, x_2 \ldots x_{N_T}$ can be represented as follows, using the vector X.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & M \\ w_{i1} & w_{i2} & \Lambda & w_{iN_T} \\ M & & O & M \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs \quad \text{[Equation 5]}$$

Here, $w_{ij}$ means a weight between the $i^{th}$ Tx antenna and the $j^{th}$ Tx information. The matrix W may be called a precoding matrix.

If $N_R$ Rx antennas are used, Rx signals $y_1, y_2 \ldots y_{N_R}$ of individual antennas are vectors and can be represented as follows.

$$y = [y_1, y_2, \Lambda, y_{N_R}]^T \quad \text{[Equation 6]}$$

If a channel is modeled in the MIMO wireless communication system, channels can be sorted according to Tx/Rx antenna indexes. A channel ranging from a Tx antenna j to an Rx antenna i is denoted by $h_{ij}$. It should be noted that in the index order of the channel $h_{ij}$, an Rx-antenna index is followed by a Tx-antenna index.

FIG. 7 (b) is a diagram showing channels from total $N_T$ Tx antennas to an Rx antenna (i). In FIG. 7 (b), the channels ranging from the $N_T$ Tx antennas to the Rx antenna (i) can be represented as follows.

$$h_i^T = [h_{i1}, h_{i2}, \Lambda, h_{iN_T}] \quad \text{[Equation 7]}$$

Hence, all channels ranging from the $N_T$ Tx antennas to $N_R$ Rx antennas can be represented as follows.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \quad \text{[Equation 8]}$$

Actually, Additive White Gaussian Noise (AWGN) is added to a channel having passed the channel matrix H. The AWGN $n_1, n_2 \ldots n_{N_R}$ added to each of $N_R$ Rx antennas can be represented as follows.

$$n = [n_1, n_2, \Lambda, n_{N_R}]^T \quad \text{[Equation 9]}$$

By the above-mentioned equation modeling, an Rx signal can be represented as follows.

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_i \\ M \\ n_{N_R} \end{bmatrix} = \quad \text{[Equation 10]}$$

$$Hx + n$$

In the meantime, the number of rows and the number of columns of a channel matrix H indicating a channel state is determined by the number of Tx/Rx antennas. In the channel matrix H, the number of rows is equal to the number $N_R$ of Rx antennas, and the number of columns is equal to the number $N_T$ of Tx antennas. Namely, the channel matrix H is denoted by $N_R \times N_T$ matrix.

A matrix rank is defined by a smaller number between the number of rows and the number of columns, in which the rows and the columns are independent from each other. Hence, the matrix rank cannot be higher than the number of rows or columns. The rank (rank(H)) of the channel matrix H is limited as follows.

$$\text{rank}(H) \leq \min(N_T, N_R) \quad \text{[Equation 11]}$$

The rank can be differently defined as the number of Eigen values when Eigen value decomposition is applied to a matrix. Similarly, the rank can be differently defined as the number of non-zero singular values when singular value decomposition is applied. Hence, the physical meaning of a rank in a channel matrix may include a maximum number capable of sending different informations on a given channel.

Hereinafter, a device-to-device communication is described.

D2D (device-to-device) communication means the communication between an electronic device and an electronic device word for word. In a broad sense, D2D communication means the wired or wireless communication between electronic devices or the communication between a human-controlled device and a machine. Recently, D2D communication generally refers to the wireless communication between an electronic device and an electronic device without human involvement.

According to a D2D or UE-to-UE communication system, UE-to-UE data exchange can be performed without going through a base station. Thus, a link directly established between devices can be named a D2D link or a sidelink. Advantageously, D2D communication has latency smaller than that of an existing base station oriented communication system and requires less radio resources. Here, a UE means a user's terminal. Yet, in case that a network equipment such as an eNB transceives signals like a UE-to-UE communication system, it can be regarded as a sort of a UE. Moreover, it is possible for an eNB to receive a D2D signal transmitted by a UE. Moreover, a UE's signal transceiving method designed for D2D transmission is also applicable to an operation of data transmission from a UE to an eNB.

To perform D2D communication, two UEs should acquire time and frequency synchronizations mutually. Generally, if two UEs are located within the coverage of an eNB, the two UEs are synchronized by PSS/SSS, CRS or the like transmitted by an eNB and time/frequency synchronization can be maintained on the level of enabling direct signal transmission/reception between the two UEs.

Meanwhile, a D2D transmission signal transmitted via a sidelink can be mainly classified into a discovery usage or a communication usage. A discovery signal is used to enable a prescribed UE to obtain what kind of UEs a plurality of adjacent UEs are. For example of a sidelink channel for transmission/reception of a discovery signal, there is a physical sidelink discovery channel (PSDCH). A communication signal is a signal that carries general data (e.g., audio or image information, etc.) a UE intends to transmit. For example of a sidelink channel for transmission/reception of a communication signal, there are a physical sidelink broadcast channel (PSBCH), a physical sidelink shared channel (PSSCH), a physical sidelink control channel (PSCCH), etc.

Figure 8:
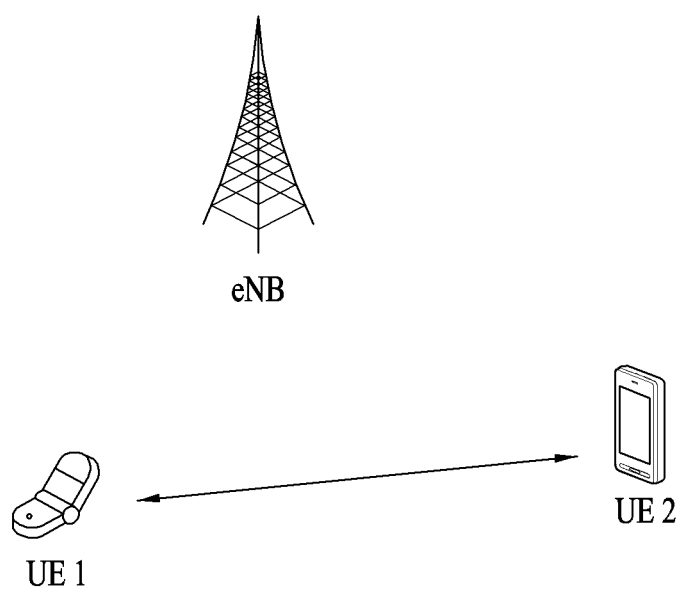
FIG. 8 is a diagram exemplarily showing operations of UE1 and UE2 that perform D2D communication.V2X (vehicle-to-everything) communication environment.

FIG. 8 shows examples of operations of UE1 and UE2 performing D2D communication.

In FIG. 8, a UE may mean a network equipment (e.g., a terminal, a base station, etc.) that transceives signals according to a D2D communication system. A transmitting UE (UE1) selects a resource unit corresponding to a specific resource from a resource pool, which means a series of resource sets and is able to transmit a D2D signal using the corresponding resource unit. A resource pool enabling the UE1 to transmit signals is configured for a receiving UE (UE2), and the UE2 can detect a signal of the UE1 from the resource pool. Here, if the UE1 is located in a connectivity range of a base station, it can be informed of the resource pool by the base station. If the UE1 is located out of the connectivity range of the base station, it can be informed of the resource pool by another UE (e.g., UE1) or the resource pool may be determined as a predetermined resource. Generally, a resource pool consists of a plurality of resource units. Each UE can select one or a plurality of resource units from the resource pool and use the selected resource units for D2D signal transmission of its own.

Described in the present invention is a method of measuring channel status information (CSI) effectively in an environment, in which such D2D communication and/or multiple transceivers can coexist, and controlling interference between the transceivers based on the measurement. CSI generally means a status of a channel observed in aspect of a specific receiver, and more particularly, a channel status observed when a specific transmitter transmits a desired signal on a specific condition and other transmitters transmit interference signals on the specific condition. Generally, CSI may be represented in form of SINR, which will be experienced by a corresponding receiver if a corresponding condition is maintained, a modulation and coding scheme (MCS) for enabling optimal transmission, and/or precoding matrix (PM) information. If a transmitter and a receiver include a base station and a user equipment (UE) in a specific time/frequency resource, respectively, it may be called downlink (DL) transmission. If a transmitter and a receiver include a user equipment (UE) and a base station, respectively, it may be called uplink (UL) transmission. If a transmitter is a UE and a receiver is a UE as well, it may be called sidelink (SL) or D2D (device-to-device) communication. A transmitter can perform scheduling by selecting a receiver capable of using a corresponding resource most effectively based on CSI of receivers and is able to use optimal MCS and PM for transmission to the corresponding receiver.

In order to use a time/frequency resource given in a wireless communication environment from which traffics of various attributes are generated from a plurality of users, it is advantageous that a system dynamically changes a transmission scheme of an individual transmitter depending on a situation. Here, 'determining the transmission scheme' means determining: i) whether a specific time/frequency resource is used for a transmission of a type of DL, UL or SL; ii) whether to use the transmission type for a transmission from a prescribed transmitter to a prescribed receiver if the transmission type is determined; and iii) whether to use a prescribed transmission parameter (e.g., MCS, PM, transmission power) if a transmitter and a receiver are determined. If a specific base station stores a considerable amount of data to transmit to a user equipment, it is advantageous that time/frequency resources are used for DL transmission as many as possible. If a considerable amount of data are generated from a user equipment connected to a specific base station, it will be advantageous that time/frequency resources are used for UL transmission as many as possible.

Thus, if each of the different transceivers dynamically determines the optimal transmission scheme, it is very difficult to measure CSI. Interference experienced in aspect of a specific receiver is determined by a transmission scheme of an adjacent transmitter. Although CSI is measured at a specific timing, once it is a timing for performing a transmission to a corresponding receiver according to the CSI actually, transmitters around the receiver can change the transmission schemes depending on a situation. As a result, it may cause a problem that utility of a previously measured CSI is lowered. Particularly, in case of changing a selection of DL, UL or SL, since basic attributes (e.g., UL/SL transmitted by a UE of a low transmission power vs. DL transmitted by a base station of a high transmission power) of a transmitter or targeted coverages (e.g., DL/UL requiring a relatively long coverage vs. SL mainly targeting short-range communication) are different considerably, if an adjacent transmitter changes it between a CSI measurement timing and an actual use timing, CSI utility is lowered considerably.

Thus, described in the present invention is a method of measuring CSI effectively and controlling interference between a transmitter and a receiver in a situation that each of the above-mentioned transmitter and receiver dynamically changed a transmission scheme.

First of all, in the present invention, a series of time/frequency resources are assumed as a CSI interference measurement resource set (CSI-IMRS) for CSI exists. The CSI-IMRS may appear by uniform periods and is able to hop a frequency according to a given rule to cover various frequency regions with small overhead. A single CSI-IMRS is assumed as partitioned into a plurality of resource units and each of the resource units is named a CSI interference measurement resource unit (CSI-IMRU).

The CSI-IMRU can be regarded as a resource for showing an interference situation in a wireless communication system. For example, on each CSI-IMRU, transmission of at least one of a DL interference signal, a UL interference signal and an SL interference signal for interference measurements can be performed.

Figure 9:
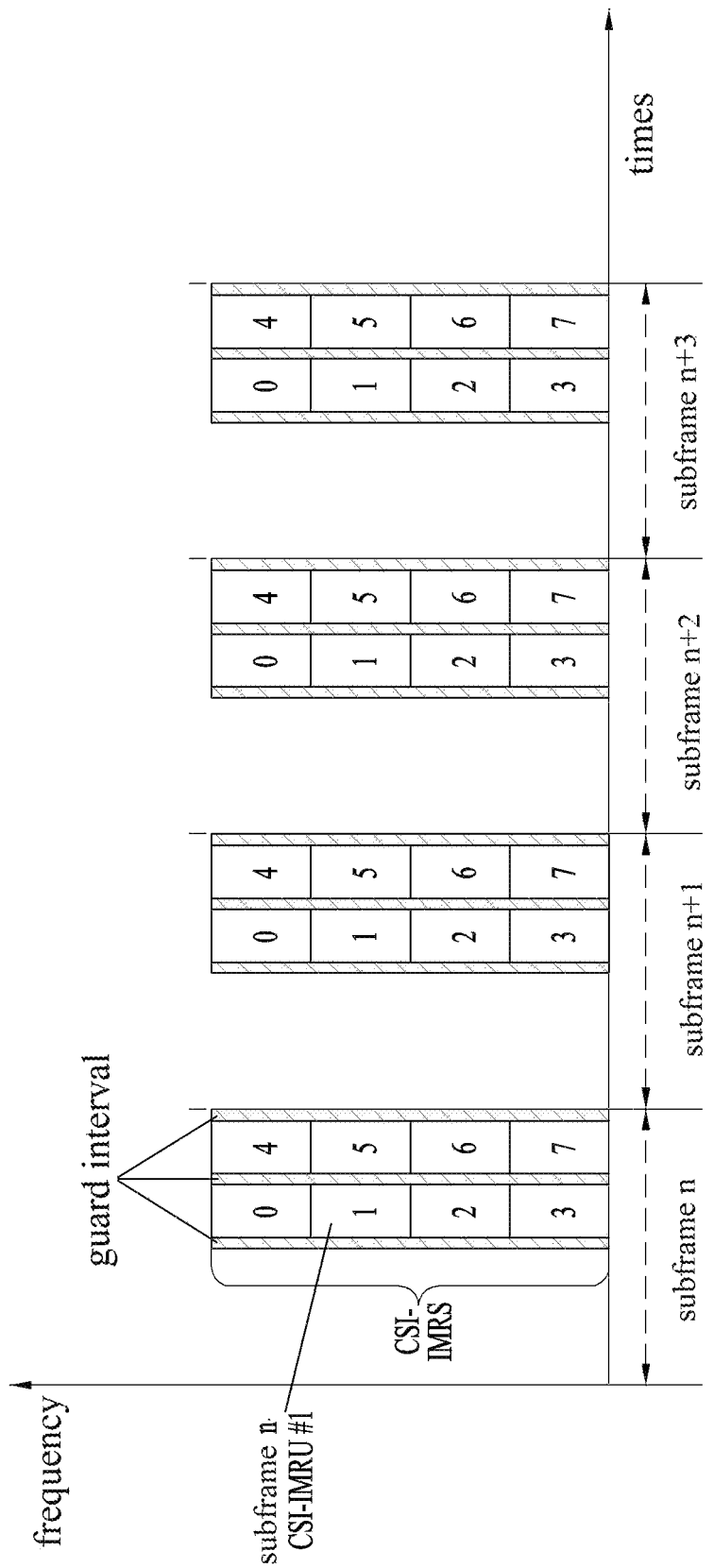
FIG. 9 is a diagram exemplarily showing structures of CSI-IMRS (CSI interference measurement resource set) and CSI-IMRU (CSI interference measurement resource unit) according to one embodiment of the present invention.

FIG. 9 is a diagram showing one example of such CSI-IMRS and CSI-IMRU structures.

In FIG. 9, shown is a situation that CSI-IMRS configured with total 8 CSI-IMRUs appear repeatedly by utilizing 2 symbol durations for 4 CSI-IMRUs during 1 OFDM symbol duration in a last part of each subframe. A network can set whether CSI-IMRS appears in each subframe and also set the number of CSI-IMRUs that configure CSI-IMRS. As described later, interference due to UL and SL should be measured through CSI-IMRU as well as adjacent DL, which means that some UEs should be able to transmit an interference signal on CSI-IMRU. Hence, it is able to design a structure in a manner that a UE can apply a timing advance required for a switching between a transmitting operation and a receiving operation and an uplink transmission by leaving a guard period around CSI-IMRU.

Meanwhile, according to the embodiment shown in FIG. 9, a guard period is configured around each symbol to enable transmission/reception switching for each CSU-IMRU symbol, by which the present invention is non-limited.

For example, if whether an individual base station or UE performs a transmitting/receiving operation is maintained on a single CSI-IMRS, a guard period can be configured at the start and end of CSI-IMRS only. And, some of them may be omitted depending on a presence or non-presence of DL, UL or SL operation before/after CSI-IMRS as well.

Namely, if an operation of one of DL, UL and SL is performed on a single CSI-IMRS, a guard period for the conversion between Tx and RX operations of a UE may not be configured in the single CSI-IMRS.

Moreover, unlike UL transmission performed on a different UL resource, since UL transmission performed within CSI-IMRS is performed to just show an interference situation, as the UL transmission within CSI-IMRS is performed without applying a timing advance (TA), a guard period for applying a UL timing advance may be omitted. In this case, if a specific UE operates to perform transmission in a specific CSI-IMRS for interference measurement of another UE/base station, it operates to transmit a signal by setting a timing advance to 0 in the corresponding CSI-IMRS.

Each transmitter (i.e., base station (BS) transmitting DL or UE transmitting UL/SL) generates a different interference situation on each CSI-IMRU and/or CSU-IMRS. In a cell configured with a single base station and a plurality of UEs connected to the base station, there are various methods of generating a different interference on CSI-IMRU and CSU-IMRS and the following embodiment can be possibly provided.

First of all, a base station can select one of DL, UL and SL as a transmission scheme for generating interference from CSI-IMRS of a specific subframe. If a base station or UE can simultaneously perform transmission and reception using a specific frequency at a specific timing, it is possible to perform interference generation by selecting DL and UL simultaneously. Each base station can select a transmission scheme for generating interference by being adapted to its situation. Hence, as a result, a different cell can generate interference differently from the same CSI-IMRS by differently selecting one of DL, UL and SL. If CSI-IMRS is configured with a plurality of OFDM symbols, one operation may be selected from DL, UL and SL for each symbol.

Secondly, a base station can select a transmitter to transmit a signal in a specific symbol configuring CSI-IMRS. In case of DL, a base station may become a transmitter. In case of UL or SL, a UE may become a transmitter. Since a plurality of UEs are generally connected to a single base station, a base station can indicate that which UE performs transmission in a prescribed symbol. Here, when a UE (e.g., half duplex) fails to have a function of receiving a signal at a specific timing while transmitting a signal, the UE can measure CSU through CSI-IMRU in a symbol that is not transmitted by the UE. In order that different UEs can measure mutual interference by performing transmission and reception at different timings, a subframe index of CSI-IMRS to be transmitted by each UE and/or a symbol index of CSI-IMRU can be changed into a predetermined pattern without being fixed according to time. Such a pattern can be induced from a pseudo random sequence determined from a uniform seed value. A base station may designate a seed value that will be used by an individual UE, or this value may be induced from the ID of the UE and/or the base station. Yet, although the pattern is determined as transmitted by a specific UE in a symbol of a specific CSI-IMRU, of the base station designates the usage of the corresponding CSI-IMRU as a DL usage with a separate signal, the transmission of the corresponding UE may be provided as stopped.

Each transmitter can differently configure a transmission parameter to use on a CSI-IMRU that uses a different frequency in a symbol of a CSI-IMRU transmitted by the transmitter. This transmission parameter includes a precoding matrix (PM) in case of multiple transmitting antennas and may also include transmission power. This transmission power may be set to 0. Hence, as a specific CSI-IMRU uses a transmission power of 0, if the corresponding transmitter does not perform transmission, interference can be measured by a different receiver. In doing so, a transmission parameter to be used by each transmitter can be changed into a uniform pattern between CSI-IMRUs. If a transmitter is a UE, a base station may instruct a base station to use a prescribed transmission parameter at a prescribed timing.

If each transmitter performs signal transmission for CSI-IMRS according to the aforementioned method, a surrounding receiver measures interference from individual CSI-IMRU. The interference measured by the receiver differs depending on CSI-IMRU. Although CSI-IMRU has the same index, it may have different features depending on a subframe index to which CSI-IMRS pertains (e.g., interference measured on CSI-IMRU #1 in subframe n and interference measured on CSI-IMRU #1 in subframe n+1 may differ from each other). If a receiver is a UE, the UE calculates CSI by combining a signal measurement from a base station connected to the UE with such an interference measurement and then reports it to the base station. Reporting CSI for all CSI-IMRUs may become excessive overhead.

Methods of reporting it effectively are described as follows. A base station may instruct a UE to take one of the following operations.

A UE can select and report some CSIs having high spectral efficiency among the above-measured CSIs. For example, it is able to report information on some CSI-IMRUs from which low interference is observed. Particularly, the UE selects CSI-IMRU making an interference situation good for the UE (i.e., a low interference measured situation) and calculates to report CSI for each CSI-IMRU. And, the UE reports a subframe and a location index of the interference measured CSI-IMRU for each CSI (i.e., index of CSI-IMRU in a specific subframe) together, thereby enabling a base station to obtain that it is measured in a prescribed environment. Or, the UE selects a series of CSI-IMRUs (i.e., a CSI-IMRU set) making an interference situation god for the UE and calculates to report a representative CSI obtainable through the corresponding CSI-IMRU. In this case, it is able to additionally report a set of CSI-IMRUs that can be represented by the CSI. For example, when a bitmap corresponding to the number of CSI-IMRUs is reported, if a specific CSI-IMRU is included, a UE can make a report by setting a bit corresponding to the specific CSI-IMRU to 1.

As an alternative to the above operation or an additional operation, the UE can report a set of CSI-IMRUs (e.g., interference is observed over a predetermined level) not preferable for the UE to the base station. Having received it, the base station can operate not to schedule the corresponding UE when performing an operation on the corresponding CSI-IMRU.

Meanwhile, the base station designates a specific CSI-IMRU and is able to instruct to report CSI for the corresponding CSI-IMRU. Particularly, this scheme is advantageous in enabling accurate link adaptation when the base station intends to generate specific interference intentionally. In this case, CIS can be calculated and reported per CSI-IMRU designated by the base station as well. Or, a single CSI corresponding to all CSI-IMRUs designated by the base station may be reported. Of course, the base station can designate a plurality of CSI-IMRU sets and a single CSI representing each of the sets can be reported.

As a combination of the above methods, if the base station designates a specific CSI-IMRU set, the UE selects CSI-IMRU from the set and is then able to report a CSI according to the selection. Namely, the base station limits the possibility of UE's CSI-IMRU selection.

As another combination of the above methods, when some CSIs are reported, they are selected from all CSI-IMRUs by the UE on the basis of spectral efficiency. And, when the rest of CISs are reported, such a report may relate to CSI-IMRU designated by the base station.

The base station performs measurement based on UE's CSI report if making a transmission by itself (i.e., case of DL transmission). The base station performs measurement by itself in case of not making a transmission by itself (i.e., case of UL/SL transmission). This, the base station can obtain CSI for each CSI-IMRU through direct measurement of its own. If the base station obtains that a prescribed transmitter uses a prescribed transmission parameter for CSI-IMRU (i.e., the base station can obtain a transmission of its own and a transmission of a UE connected to the base station), the base station selects an appropriate CSI, sets each transmitter to maintain a transmission parameter in a situation having the corresponding CSI measured therein, and is then able to perform DL, UL and SL scheduling.

Meanwhile, in this case, it is necessary to obtain information on a transmission parameter and a transmitter in an adjacent cell separately. This can be performed through communication between base stations.

Particularly, the base station obtains an appropriate interference situation in a resource the base station intends to schedule, and is then able to inform a surrounding base station of it. Namely, the base station can inform a surrounding base station of a preferable CSI-IMRU index in a specific data Tx/Rx resource. Having received it, the surrounding base station performs a Tx/Rx operation of the corresponding CSI-IMRU on the corresponding data Tx/Rx resource or may instruct a UE connected to the surrounding base station to perform such an operation. For the flexibility of the surrounding base station's selection, it is possible to indicate a plurality of preferable CSI-IMRU indexes. Additionally, the base station quantifies a gain (e.g., an increase rate of estimated spectral efficiency) obtainable if an interference situation on each CSI-IMRU index is reproduced and then transmits it to an adjacent base station, thereby helping the adjacent base station to determine whether to reproduce the operation on the corresponding CSI-IMRU. On the contrary, the base station can inform the surrounding base station of a CSI-IMRU index not preferable in a specific data Tx/Rx resource. Having received it, the surrounding base station can instruct itself not to perform a Tx/Rx operation of the corresponding CSI-IMRU on the corresponding data Tx/Rx resource and also instruct a UE connected to the surrounding base station to perform operations other than the Tx/Rx operation The base station can inform the surrounding base station whether interference to be generated by the base station from a resource to be scheduled by the base station will be identical to a prescribed CSI-IMRU. Namely, the base station determines DL, UL, SL and transmission parameter to select from a specific data Tx/Rx resource and is then able to inform the surrounding base station of a previous CSI-IMRU index with which an operation identical or similar to it was performed. Based on this, the surrounding base station predicts what kind of interference will be generated from a prescribed data Tx/Rx resource and is able to perform scheduling that reflects the prediction.

Figure 10:
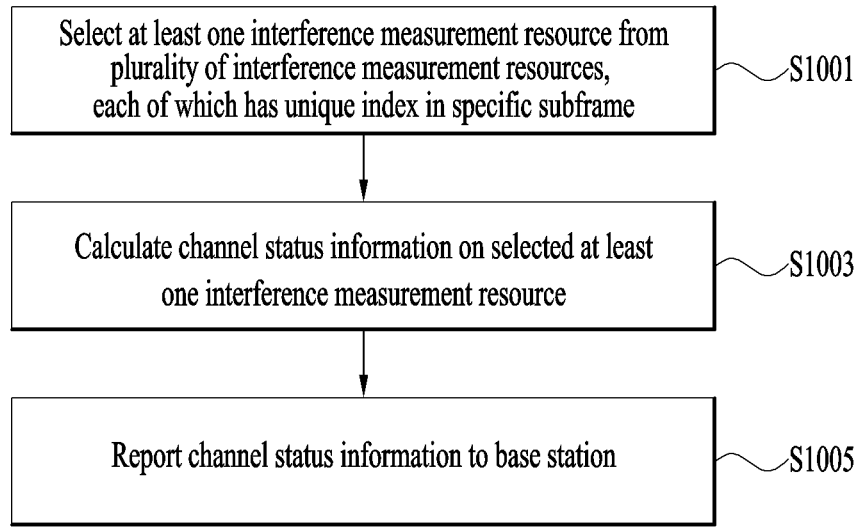
FIGS. 10 to 12 are diagrams exemplarily showing a CSI reporting operation according to embodiments of the present invention.

FIG. 10 is a diagram exemplarily showing a CSI reporting operation according to one embodiment of the present invention.

Referring to FIG. 10, a UE can select at least one interference measurement resource from a plurality of interference measurement resources, each of which has a unique index in a specific subframe [S1001]. Namely, according to the present embodiment, an operation for the UE to select an interference measurement resource for reporting a CSI is illustrated.

Each of a plurality of the interference measurement resources may include a CSI-IMRU described with reference to FIG. 9. On each of a plurality of the interference measurement resources, at least one of a DL interference signal from a base station, a UL interference signal from the UE or other UEs, and a D2D interference signal from the UE or other UEs can be transmitted.

In some embodiments, the selected at least one interference measurement resource may include a resource having an interference value equal to or smaller than a specific threshold among a plurality of the interference measurement resources. Namely, as described with reference to FIG. 9, the UE can select an interference measurement resource that makes an interference situation good for the UE (e.g., a low interference measured situation).

Thereafter, the UE can calculate CSI for the selected at least one interference measurement resource [S1003] and then report the CSI to the base station [S1005].

Here, the CSI can be reported together with a subframe index of the specific frame and the unique index of the at least one interference measurement resource. This is to enable the base station to be aware that the corresponding CSI is measured in a prescribed environment (i.e., a prescribed interference situation).

The UE may operate to additionally report a unique index of a resource in a poor interference situation among a plurality of the interference measurement resources (e.g., a resource having an interference value equal to or greater than a specific threshold) and a subframe index of a subframe, to which the resource having the interference value equal to or greater than a specific threshold belongs, to the base station [not shown in FIG. 10].

Meanwhile, according to the present embodiment, a UE is described as selecting an interference measurement resource and then calculating to report a CSI for the selected interference measurement resource only, by which the present invention is non-limited. Namely, the UE calculates CSIs on all of a plurality of the interference measurement resources and operates to report the CSI on the selected interference measurement resource only.

Figure 11:
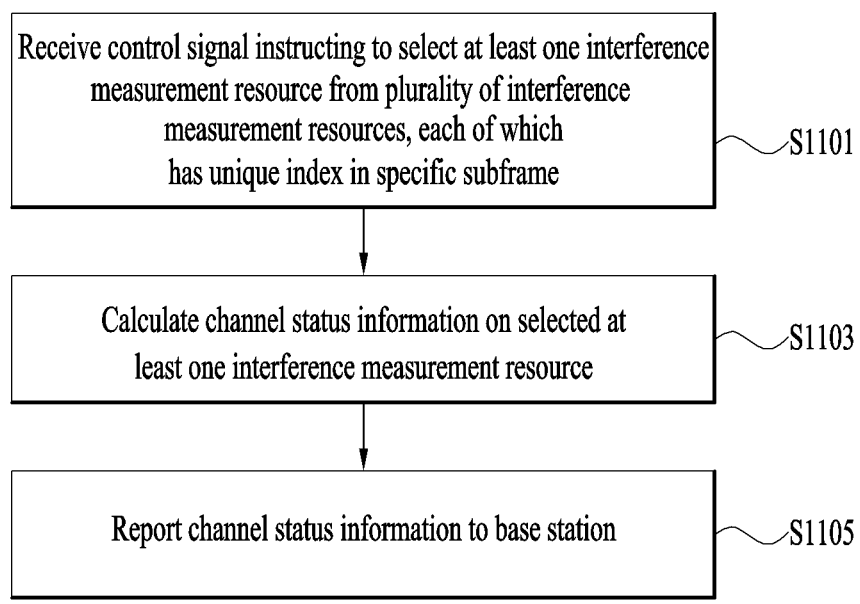

FIG. 11 is a diagram exemplarily showing a CSI reporting operation according to another embodiment of the present invention.

Referring to 11, a UE receives a control signal instructing to select at least one interference measurement resource from a plurality of interference measurement resources, each of which has a unique index in a specific subframe [S1101], calculates CSI on the selected at least one interference measurement resource [S1103], and is then able to report the CSI to a base station [S1105]. Unless there is separate explanation, the steps S1103 and S1105 can be executed in manners similar to those of the former steps S1003 and S1005 described with reference to FIG. 10, respectively. And, redundant description shall be omitted for clarity of the description.

According to the present embodiment, an operation for a base station to designate an interference measurement resource for reporting CSI is illustrated. According to this illustration, accurate link adaptation is advantageously enabled if the base station plans to generate specific interference intentionally.

Meanwhile, the present invention may be implemented by combining FIG. 10 and FIG. 11 instead of being limited by FIG. 10 or FIG. 11. For example, a UE may individually calculate CSI on an interference measurement resource selected by the UE and CSI on an interference measurement resource designated by a base station and then report the calculated CSIs.

According to some embodiments, a UE may calculate and report CSI on each interference measurement resource designated by a base station, or a single CSI corresponding to all interference measurement resources designated by the base station.

Figure 12:
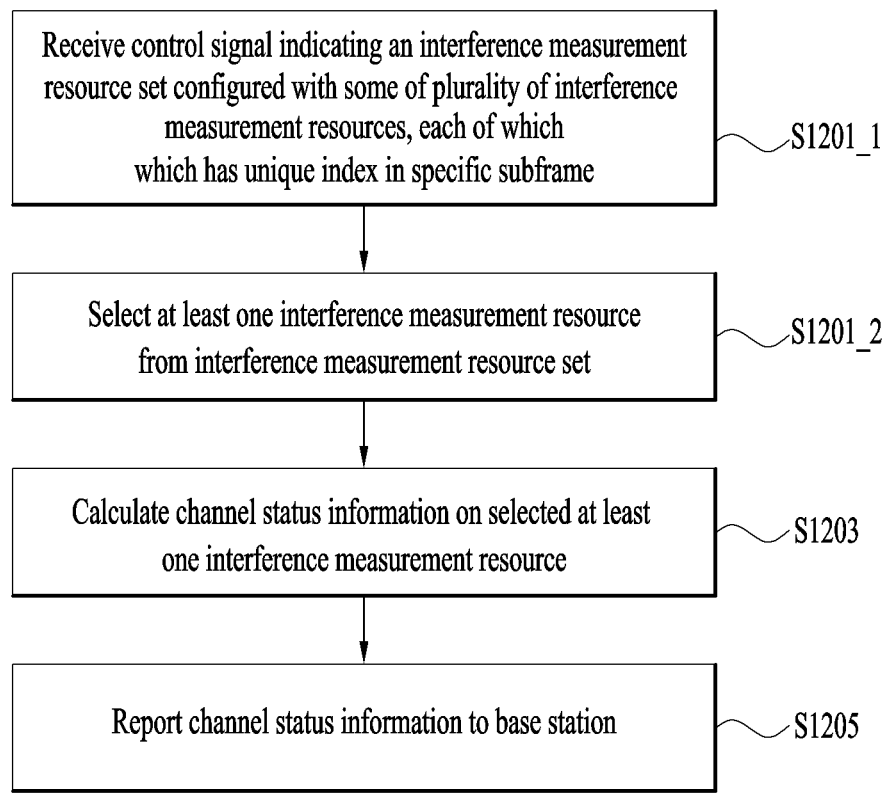

FIG. 12 is a diagram exemplarily showing a CSI reporting operation according to further embodiment of the present invention.

Referring to 12, a UE receives a control signal indicating an interference measurement resource set configured with some of a plurality of interference measurement resources, each of which has a unique index in a specific subframe [S1201_1], selects at least one interference measurement resource from the interference measurement resource set [S1201_2], calculates CSI on the selected at least one interference measurement resource [S1203], and is then able to report the CSI to a base station [S1205]. According to the present embodiment, the base station can restrict a UE's selection width of the interference measurement resource, and the UE has an opportunity to select an interference measurement resource for a CSI report within the interference measurement resource restricted by the base station.

The steps S1203 and S1205 can be executed in manners similar to those of the former steps S1003 and S1005 described with reference to FIG. 10, respectively.

According to the above embodiments of the present invention, even in a situation that a plurality of Tx/Rx devices change transmission schemes dynamically, a UE can effectively measure and report CSI by considering overhead possibly accompanied by an excessive CSI report.

The aforementioned principle of the present invention is applicable to the measurement and report for general radio resource management as well as to the CSI measurement and report. For example, the principle can be utilized for the usage of determining a DL serving cell and Tx parameters to use for DL transmission to a specific UE for a relatively long time or for the usage of determining a UE to become a target of UL or SL scheduling and Tx parameters.

FIG. 12 is a block diagram for a communication device according to one embodiment of the present invention.

Figure 13:
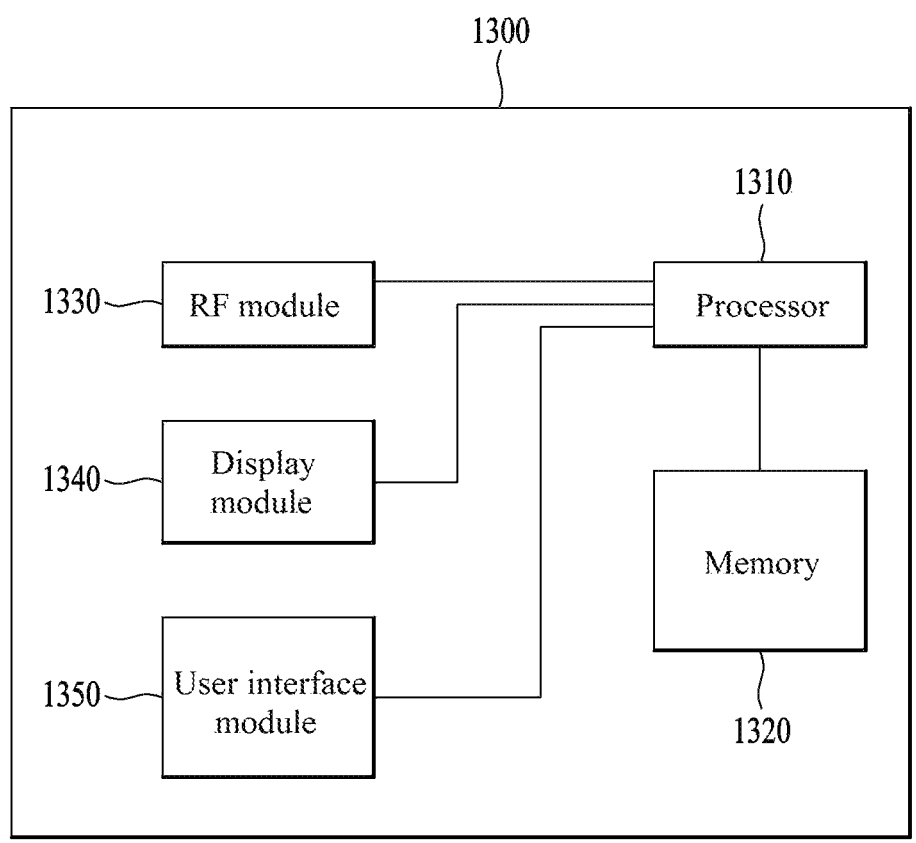
FIG. 13 exemplarily shows a block diagram of a communication device according to one embodiment of the present invention.

Referring to FIG. 13, a communication apparatus 1300 includes a processor 1310, a memory 1320, a Radio Frequency (RF) module 1330, a display module 1340 and a user interface module 1350.

The communication apparatus 1300 is shown for convenience of description and some modules thereof may be omitted. In addition, the communication apparatus 1300 may further include necessary modules. In addition, some modules of the communication apparatus 1300 may be subdivided. The processor 1310 is configured to perform an operation of the embodiment of the present invention described with reference to the drawings. For a detailed description of the operation of the processor 1310, reference may be made to the description associated with FIGS. 1 to 12.

The memory 1320 is connected to the processor 1310 so as to store an operating system, an application, program code, data and the like. The RF module 1330 is connected to the processor 1310 so as to perform a function for converting a baseband signal into a radio signal or converting a radio signal into a baseband signal. The RF module 1330 performs analog conversion, amplification, filtering and frequency up-conversion or inverse processes thereof. The display module 1340 is connected to the processor 1310 so as to display a variety of information. As the display module 1340, although not limited thereto, a well-known device such as a Liquid Crystal Display (LCD), a Light Emitting Diode (LED), or an Organic Light Emitting Diode (OLED) may be used. The user interface module 1350 is connected to the processor 1310 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'enhanced Node B (eNode B or eNB)', 'access point', etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although a method of allocating a resource for performing direct communication between UEs in a wireless communication system and an apparatus therefor are described with reference to examples applied to 3GPP LTE system, it may be applicable to various kinds of wireless communication systems as well as the 3GPP LTE system.

What is claimed is:

1. A method of reporting channel status information (CSI) by a user equipment in a wireless communication system, the method comprising:
receiving information on a plurality of interference measurement resources respectively having unique indexes in a specific subframe and information for a report type indicating a type of information to be reported further when reporting the CSI, from a base station;
calculating the CSI on the plurality of interference measurement resources;
selecting at least one interference measurement resource for which interference below a predetermined first threshold is calculated from the plurality of interference measurement resources based on the calculated CSI;
reporting only the CSI calculated for the selected at least one interference measurement resource to the base station based on the information for the report type; and
additionally reporting aggregation information including the unique indexes for interference measurement resources for which interference above a predetermined second threshold higher than the predetermined first threshold is calculated among the plurality of interference measurement resources based on the calculated CSI,
wherein the CSI is reported together with a subframe index of the specific subframe and a unique index of the selected at least one interference measurement resource when the report type of the CSI is a first report type,
wherein the CSI is reported together with a bitmap corresponding to the plurality of interference measurement resources when the report type of the CSI is a second report type, and
wherein the bitmap is configured such that a bit value of a position corresponding to the selected at least one interference measurement resource is configured to 1.

2. The method of claim 1, wherein at least one of a downlink interference signal from the base station, an uplink interference signal from the user equipment or other user equipments, and a device-to-device (D2D) interference signal from the user equipment or other user equipments is transmitted on each of the plurality of interference measurement resources.

3. The method of claim 1, further comprising receiving a control signal indicating an interference measurement resource set configured with some of the plurality of interference measurement resources from the base station,
wherein the at least one interference measurement resource is selected from the interference measurement resource set by the user equipment.

4. A user equipment configured to report channel status information (CSI) in a wireless communication system, the user equipment comprising:
a transceiver; and
a processor,
wherein the processor is configured to:
control the transceiver to receive information on a plurality of interference measurement resources respectively having unique indexes in a specific subframe and information for a report type indicating a type of information to be reported further when reporting the CSI, from a base station,
calculate the CSI on the plurality of interference measurement resources,
select at least one interference measurement resource for which interference below a predetermined first threshold is calculated from the plurality of interference measurement resources based on the calculated CSI,
report only the CSI calculated for the selected at least one interference measurement resource to the base station based on the information for the report type, and
additionally report aggregation information including the unique indexes for interference measurement resources for which interference above a predetermined second threshold higher than the predetermined first threshold is calculated among the plurality of interference measurement resources based on the calculated CSI wherein the CSI is reported together with a subframe index of the specific subframe and a unique index of the selected at least one interference measurement resource when the report type of the CSI is a first report type, wherein the CSI is reported together with a bitmap corresponding to the plurality of interference measurement resources when the report type of the CSI is a second report type, and wherein the bitmap is configured such that a bit value of a position corresponding to the selected at least one interference measurement resource is configured to 1.

5. The user equipment of claim 4, wherein at least one of a downlink interference signal from the base station, an uplink interference signal from the user equipment or other user equipments, and a device-to-device (D2D) interference signal from the user equipment or other user equipments is transmitted on each of the plurality of interference measurement resources.

6. The user equipment of claim 4, wherein the processor is further configured to receive a control signal indicating an interference measurement resource set configured with some of the plurality of interference measurement resources from the base station and wherein the at least one interference measurement resource is selected from the interference measurement resource set by the user equipment.

\* \* \* \* \*